United States Patent [19]

Roberts

[11] 4,429,772

[45] Feb. 7, 1984

[54] DRUM BRAKE ANCHOR ASSEMBLY

[75] Inventor: James K. Roberts, South Bend, Ind.

[73] Assignee: The Bendix Corporation, Southfield, Mich.

[21] Appl. No.: 301,626

[22] Filed: Sep. 14, 1981

[51] Int. Cl.³ .................... F16D 51/24; F16D 51/52
[52] U.S. Cl. .................................. 188/328; 188/331;
    188/341; 188/342; 188/206 A
[58] Field of Search .................. 188/206 A, 325, 327,
    188/328, 330, 331, 332, 341, 342, 106 A; 192/75

[56] References Cited

U.S. PATENT DOCUMENTS

| 2,111,503 | 3/1938 | Axtmann | 188/332 |
| 2,775,315 | 12/1956 | Maruhn et al. | 188/331 |
| 3,870,131 | 3/1975 | Firth et al. | 188/325 |
| 3,951,243 | 4/1976 | Chonings | 188/328 |
| 4,249,646 | 2/1981 | Roberts | 188/331 |
| 4,336,867 | 6/1982 | Woo | 188/106 A |
| 4,353,441 | 10/1982 | Roberts | 188/341 |
| 4,364,456 | 12/1982 | Colpaert | 188/106 A |

FOREIGN PATENT DOCUMENTS

| 1000246 | 1/1957 | Fed. Rep. of Germany | 188/341 |
| 485920 | 10/1953 | Italy | 188/341 |
| 699304 | 11/1953 | United Kingdom | 188/206 A |
| 706238 | 3/1954 | United Kingdom | 188/206 A |
| 707547 | 3/1954 | United Kingdom | 188/331 |

Primary Examiner—Douglas C. Butler
Assistant Examiner—R. R. Diefendorf
Attorney, Agent, or Firm—Paul D. Schoenle; Ken C. Decker

[57] ABSTRACT

A drum brake assembly includes a pair of brake shoes (16, 18) which are movable by a hydraulic actuator (14) to a braking position. A parking brake lever assembly (24) is operable to also move the pair of brake shoes to the braking position. An anchor assembly (40) is attached to a backing plate (12) and is engageable with the pair of brake shoes to either absorb braking torque during a service brake application, or impart movement from one brake shoe to the other during a parking brake application. The anchor assembly includes a connecting member (44) engageable with the pair of brake shoes and rotatable in response to operation of the parking brake lever assembly to a released position on the anchor assembly (40).

6 Claims, 6 Drawing Figures

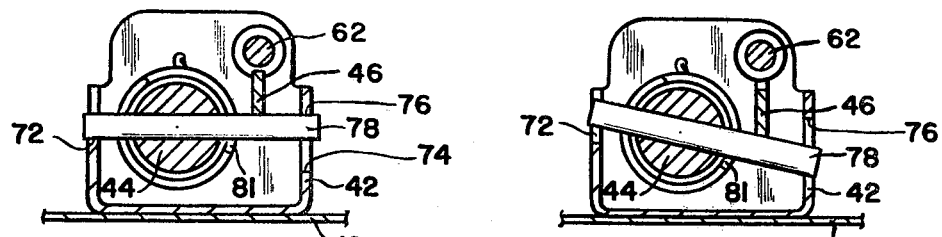
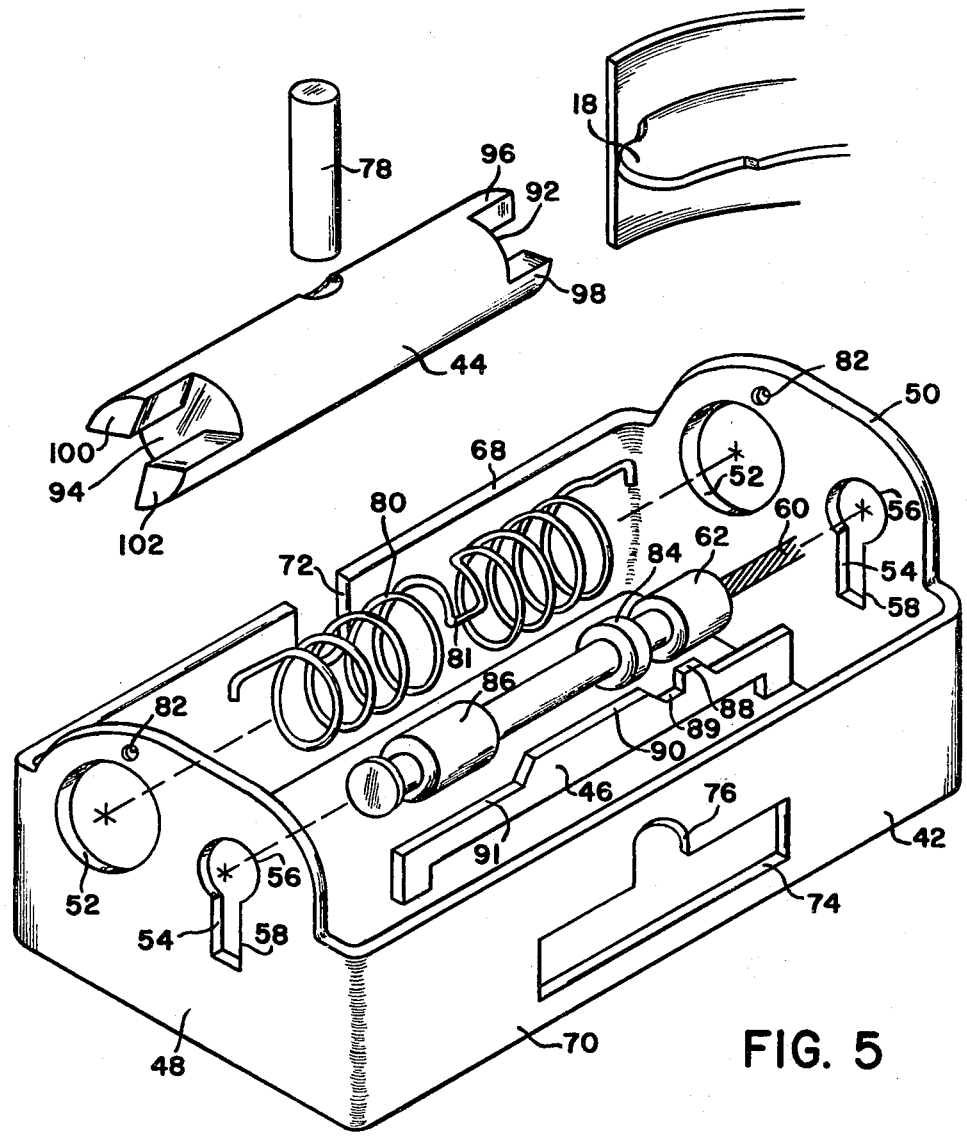

DRUM BRAKE ANCHOR ASSEMBLY

This invention relates to a drum brake assembly, and, more particularly, a drum brake assembly operable as a non servo drum brake during a service brake application and also operable as a duo servo drum brake during a parking brake application.

In my U.S. Pat. No. 4,249,646 a drum brake assembly is provided with a pair of brake shoes, a hydraulic actuator cooperating with the pair of brake shoes during a service brake application and a parking lever assembly cooperating with the pair of brake shoes during a parking brake application. An anchor assembly defines a first mode of operation during a service brake application wherein torque developed during braking is transfered to a backing plate via the anchor assembly and also defines a second mode of operation during a parking brake application wherein the anchor assembly is released to prevent torque transfer by the anchor assembly. This release action for the anchor assembly is accomplished by a latch and a connecting link between the pair of brake shoes. When the parking lever is idle, the latch engages the connecting link to secure the latter to the backing plate and when the parking lever is actuated, the latch separates from the connecting link to permit the latter to move relative to the backing plate.

The prior art as evidenced in my foregoing U.S. Pat. No. 4,249,646 required numerous modifications to the backing plate which may present a problem during manufacture of the drum brake in question. Consequently, the present invention provides a simpler anchor assembly requiring only a single connection between the backing plate and a bracket of the anchor assembly. The anchor assembly also provides a connecting member on the bracket which engages the brake shoes and rotates about its longitudinal axis to change from the first mode to the second mode.

The present invention provides a drum brake assembly with an anchor assembly defining a duo mode of operation, a pair of brake shoes movably by a hydraulic actuator during a service brake operation to a braking position, a parking lever assembly cooperating with the pair of brake shoes to move the latter to the braking position during a parking brake operation, a backing plate supporting the hydraulic actuator, the anchor assembly and the pair of brake shoes, the anchor assembly defining a first mode of operation during the service brake operation to transfer torque developed during braking to the backing plate via the anchor assembly, the anchor assembly defining a second mode of operation during the parking brake operation to substantially prevent the transfer of torque developed during braking to the anchor assembly, and the anchor assembly including a connecting member extending between the pair of brake shoes, the connecting member being fixed laterally relative to the backing plate during the first mode of operation and movable relative to the backing plate during the second mode of operation, characterized by said anchor assembly further including a bracket supporting the connecting member, said bracket also supporting a portion of the parking lever assembly, and the connecting member being rotatable in the first mode of operation in response to movement of said portion in order to reach a position permitting movement in the second mode of operation.

It is an advantage of the invention that a connecting member between a pair of brake shoes is rotatable about its longitudinal axis and is also movable with the pair of brake shoes. Also, the parking lever is easily modified to control rotation of the connecting member.

FIG. 2 is a view of the anchor assembly for the drum brake of FIG. 1 taken along line 2—2;

FIG. 3 is a view similar to FIG. 2 when the parking brake is applied;

FIG. 5 is an exploded perspective view of the anchor assembly illustrated in FIG. 1, with only the bracket enlarged.

Figure 1:
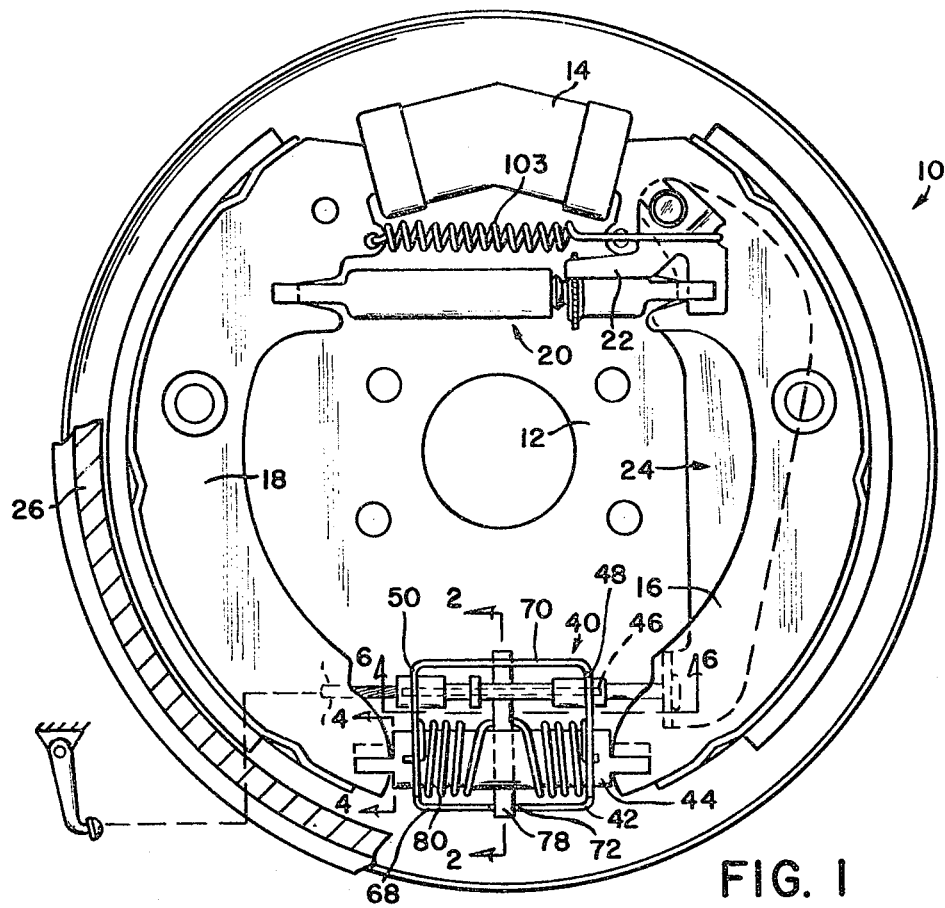
FIG. 1 is a side view of a drum brake assembly constructed in accordance with the present invention.
Figure 6:
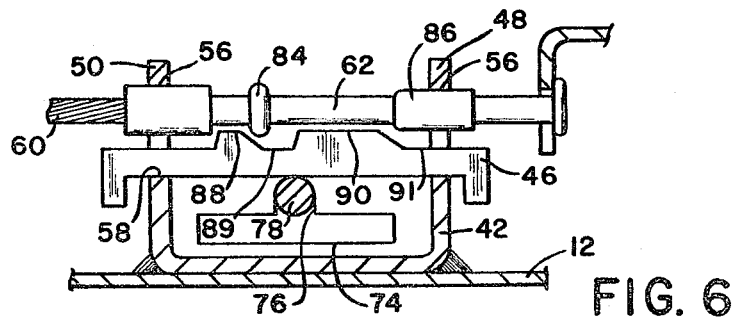
FIG. 6 is a cross-sectional view taken along line 6—6 of FIG. 1.

In FIG. 1, a drum brake assembly, generally referred to as reference numeral 10, comprises a backing plate 12 adapted for attachment to a vehicle. The backing plate 12 supports a hydraulic actuator 14 and a pair of brake shoes 16 and 18. An extendible strut 20 extends between the pair of brake shoes 16 and 18 adjacent the hydraulic actuator 14 and a pawl 22 cooperates with the strut to compensate for lining wear. Also, a parking lever assembly 24 cooperates with the strut 20 during a parking brake application to move the pair of brake shoes to a braking position engaging a drum 26.

In accordance with the invention an anchor assembly 40 is secured to the backing plate 12 opposite the hydraulic actuator 14. The anchor assembly comprises a bracket 42 attached to the backing plate by suitable means such as welding, a connecting member 4 engageable with the ends of the pair of brake shoes, and a latch bar 46. The bracket is substantially rectangular with opposite walls 48 and 50 extending normal to the backing plate. Each wall 48 or 50 defines a first opening 52 for movably receiving the connecting member 44 and a second opening 54 for receiving the latch bar 46. The second opening 54 forms a circular portion 56 and a slotted portion 58 extending from the circular portion. The latch bar 46 is disposed within the slotted portion and the parking lever assembly 24 includes a cable 60 with a fitting 62 movably disposed within the circular portion 56. The bracket includes additional opposite walls 68 and 70 extending parallel with a longitudinal axis for the connecting member 44. The bottom wall 68 forms a recess 72 while the top wall 70 forms a slot 74 with a recess 76 opening to the slot 74. In the rest position illustrated in FIGS. 1 and 2, the connecting member 44 includes a pin 78 extending normal to the connecting member axis to fit within recesses 72 and 76. Consequently in this position the connecting member 44 and the pin 78 are prevented from moving laterally relative to the bracket and backing plate. A coil spring 80 surrounds the connecting member 44 and is supported by third openings 82 on the walls 48 and 50. The coil spring 80 forms a central hook 81 engageable with the pin 78. The coil spring 80 is rotationally loaded to bias the pin 78 into the recesses 72 and 76. The cable fitting 62 defines cams 84 and 86 which cooperate with lands 88 and 90 and grooves 89 and 91 on the latch bar to control the position of the latter in slot portion 58. In the idle position, the fitting cams 84 and 86 align with the latch bar grooves 89 and 91 to permit the spring 80 to bias the latch bar via pin 78 to the top of slot portion 58, thereby retaining the pin 78 in the recesses 72 and 76.

Figure 4:
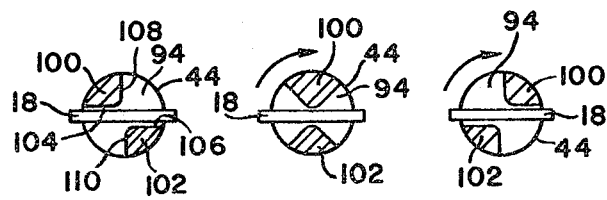
FIG. 4 is a view taken along line 4—4 of FIG. 1 showing three positions for the connecting member as it rotates relative to its longitudinal axis and one of the brake shoes.

Turning to FIGS. 4 and 5, the connecting member 44 forms notches 92 and 94 at each end for receiving the respective brake shoes 16 and 18. The notches 92 and 94 are formed by legs 96 and 98 on the right end of connecting member 44 and by legs 100 and 102 on the left end of connecting member 44. As FIG. 4 shows, the legs 100 and 102 form diametrically opposed quadrants on the circular cross section for the connecting member 44. However, the quadrants are not complete because the parallel edges 104 and 106 on legs 100 and 102, respectively are offset from each other a distance substantially corresponding to the thickness of the web for brake shoe 18. Similarly, the parallel edges 108 and 110 on respective legs 100 and 102 are offset from each other a distance substantially corresponding to the thickness of the web of brake shoe 18. Consequently, the connecting member can rotate to engage either edges 104 and 106 or edges 108 and 110 with the sides of the web of brake shoe 18.

During a service brake application, fluid pressure from a master cylinder (not shown) is communicated to the hydraulic actuator to spread the brake shoes 16 and 18 radially outward into engagement with the drum 26. With the parking brake lever assembly remaining idle the fitting 62 will retain the latch bar 46 at the top of slot portion 58 so that the spring 80 will retain the connecting member pin 78 in the bracket recesses 72 and 76. Consequently, braking torque developed by leading shoe 18 will be transferred to the backing plate 12 via connecting member 44, pin 78 and bracket 42. The trailing shoe 16 transfers braking torque to the backing plate via the hydraulic actuator 14. With the anchor assembly fixedly locating the connecting member during the service brake application, the drum brake acts like a non servo drum brake. When the service brake application is terminated, a return spring 103 retracts the pair of brake shoes to their rest position.

If the parking brake lever assembly is actuated during a parking brake application, the cable 60 and fitting 62 are pulled to the left viewing FIG. 1 so that the cams 84 and 86 will engage the lands 88 and 90 to move the latch bar 46 downwardly in the slot portion 58. Movement of the latch bar 46 downward causes the pin 78 to rotate against the force of spring 80 to withdraw from recesses 72 and 76. When the pin is free of the recesses 72 and 76, the connecting member is free to move within the bracket openings 52. At the same time, the lever 24 is cooperating with the strut 20 to move the pair of brake shoes into engagement with the drum 26. If the drum attempts to move counterclockwise in FIG. 1, the brake shoe 18 will rotate slightly counterclockwise therewith and push the brake shoe 16 into further or tighter engagement with the drum in order to generate braking torque. The brake shoe 18 moves or rotates the brake shoe 16 slightly in view of the connecting member 44 being able to move relative to the bracket 42. This braking torque is then transferred to the backing plate 12 via the hydraulic actuator. Consequently, during a parking brake application the drum brake acts like a duo servo drum brake.

Upon termination of the parking brake application, the spring 103 biases the pair of brake shoes to return to their rest position and the spring 80 biases the pin 78 and connecting member 44 to an aligned position with recesses 72 and 76. Also the spring 103 cooperates with the pawl 22 and the stud to bias the parking brake lever assembly to return to its rest or idle position. Once the pin is in alignment with the recesses 72 and 76, the forces on the fitting 62 will move the cams 88 and 90 into alignment with the latch bar grooves 89 and 91 so that the rotational force of spring 80 will bias the pin to fit into recesses 72 and 76 as well as move the latch bar upwardly in slot portion 58. Consequently, the anchor assembly will be in its rest position with the connecting member locked to the backing plate via the bracket.

I claim:

1. A drum brake assembly with an anchor assembly defining a duo mode of operation, a pair of brake shoes movable by a hydraulic actuator during a service brake operation to a braking position, a parking lever assembly cooperating with the pair of brake shoes to move the latter to the braking position during a parking brake operation, a backing plate supporting the hydraulic actuator, the anchor assembly and the pair of brake shoes, the anchor assembly defining a first mode of operation during the service brake operation to transfer torque developed during braking to the backing plate via the anchor assembly, the anchor assembly defining a second mode of operation during the parking brake operation to substantially prevent the transfer of torque developed during braking to the anchor assembly, and the anchor assembly including a connecting member extending between the pair of brake shoes, the connecting member being fixed laterally relative to the backing plate during the first mode of operation, characterized by said anchor assembly further including a bracket supporting the connecting member, said bracket also supporting a portion of the parking lever assembly, and the connecting member being rotatable from its position in the first mode of operation in response to movement of said portion in order to reach a position permitting movement in the second mode of operation, the connecting member including a transversely extending pin and said bracket defines at least one slot for receiving said pin in the first mode of operation, whereby the pin is fixed laterally within the one slot in the first mode.

2. The drum brake assembly of claim 1 in which said bracket carries a resilient member engageable with the connecting member to impart rotation thereto as the connecting member rotates between the first and second modes of operation, and said resilient member also opposes movement of said pin laterally away from said one slot.

3. The drum brake assembly of claim 2 in which said resilient member comprises a coil spring surrounding the connecting member.

4. The drum brake assembly of claim 1 in which the connecting member defines notches for receiving the pair of brake shoes and the notches define substantially opposite quadrants of a circle in a transverse cross section of the connecting member at said notches.

5. The drum brake assembly of claim 1 in which said anchor assembly defines at least one opening for receiving a latch and said one opening also receives said portion of the parking lever assembly, whereby the latch retains the pin in the slot in the first mode.

6. The drum brake assembly of claim 5 in which said latch defines at least one recess and said portion includes a projection which is movable with said portion to align with said one recess to permit said latch to move within said one opening.

* * * * *